(12) United States Patent
Serrano

(10) Patent No.: US 6,287,654 B1
(45) Date of Patent: *Sep. 11, 2001

(54) MOLDING MOLD, INJECTION MOLDING APPARATUS INCLUDING THE MOLDING MOLD, MOLDING METHOD USING THE MOLDING MOLD, AND PRODUCT MOLDED BY THE MOLDING MOLD

(75) Inventor: Virgilio Velez Serrano, West Covina, CA (US)

(73) Assignee: TDK Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,280

(22) Filed: Jul. 24, 1998

(51) Int. Cl.$^7$ .................................................. G11B 23/033
(52) U.S. Cl. ........................................... 428/35.7; 360/133
(58) Field of Search ............................... 428/35.7, 320.2, 428/63, 141, 156; 360/135, 133

(56) References Cited

U.S. PATENT DOCUMENTS

| | | | |
|---|---|---|---|
| 4,781,879 | * 11/1988 | Oishi | 264/328.12 |
| 5,161,081 | * 11/1992 | Machida et al. | 360/133 |
| 5,305,172 | * 4/1994 | Sugiaski et al. | 360/133 |
| 5,307,229 | * 4/1994 | Sata | 360/133 |
| 5,699,905 | * 12/1997 | Hara | 206/308.1 |

FOREIGN PATENT DOCUMENTS

| | | |
|---|---|---|
| 57-169518 | 10/1982 | (JP) . |
| 5-237879 | 9/1993 | (JP) . |
| 5-293857 | 11/1993 | (JP) . |
| 6-285919 | 10/1994 | (JP) . |

* cited by examiner

*Primary Examiner*—Rena L. Dye
(74) *Attorney, Agent, or Firm*—Darby & Darby

(57) ABSTRACT

Disclosed is a molding mold including a plurality of molds for forming a cavity taking a configuration corresponding to a shape of a molded product, and a gate portion, contiguous to the cavity, through which a molten resin flows into the cavity. The gate portion has a plurality of passages, thereby restraining high gate and short shot in the molded product.

4 Claims, 6 Drawing Sheets

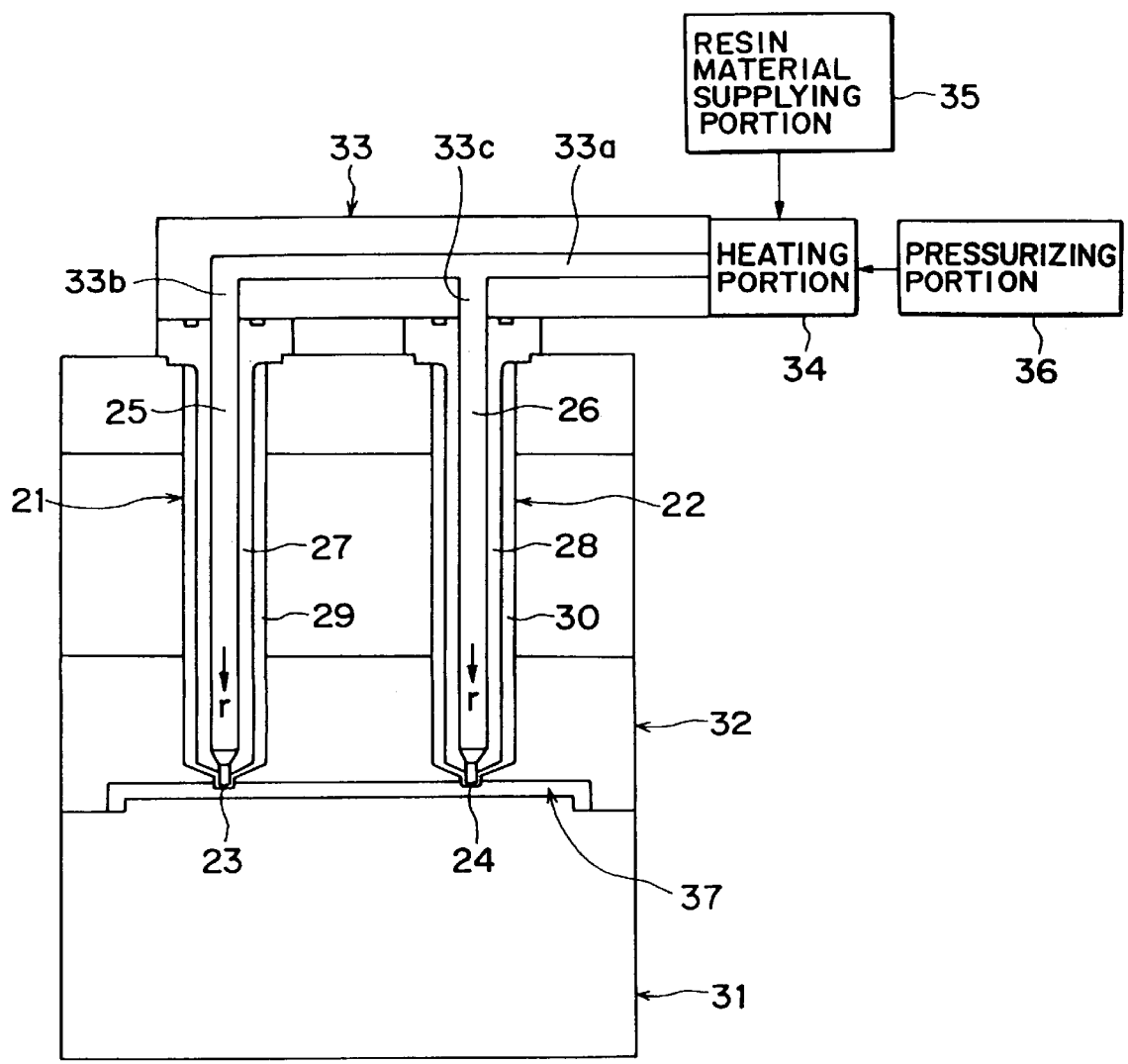

MOLDING MOLD, INJECTION MOLDING APPARATUS INCLUDING THE MOLDING MOLD, MOLDING METHOD USING THE MOLDING MOLD, AND PRODUCT MOLDED BY THE MOLDING MOLD

BACKGROUND OF THE INVENTION

1. Field of the Invention

The present invention relates generally to a molding mold for molding resin material and, more particularly, to an improvement of a gate portion of the molding mold in an open type hot-runner system, and further to a molding method using the molding mold, an injection molding apparatus to which the molding mold is added, and a product molded by the molding mold.

2. Description of the Prior Art

FIG. 8A is a plan view showing a half shell of a floppy disk molded by a molding mold adopting an open type hot-runner system in the prior art. The half shell 51 includes recessed portions 52, 53 formed in a fitting portion 51a for fitting a shutter plate. The recessed portions 52, 53 are formed so that a gate residual (a protruded portion), if produced upon mold releasing, may not protrude from a surface 54 of the shutter plate fitting portion 51a. When actually molded, however, a gate residual portion (resin residual) 55 produced, as illustrated in FIG. 8B, extends from the recessed portion 52 and protrudes from the surface 54, resulting in causing high gate. A gate diameter of a gate portion, through which molten resin flows into a cavity, was 0.7 mm.

If a size of a product increases, it is required that the gate diameter of the molding mold be enlarged in order to flow the sufficient molten resin into the cavity of the mold. As the gate diameter becomes larger, the gate residual is stretched higher, and hence a tendency of occurrence of the high gate increases. Further, when speeding up a molding cycle, the molten resin in the gate portion is not well solidified, and therefore similarly the gate residual portion tends to increase in height.

When the gate residual portion 55 protrudes from the surface 54 of the shutter plate fitting portion 51a, there must be a trouble in fitting the shutter plate, which therefore needs a step of removing the protruded portion from the surface of the gate residual portion 55 by a post-process. As a result of an increased number of steps, the productivity declines.

Further, if the resin residual is attached to the gate portion, a flow of the molten resin is hindered, and consequently the cavity is not sufficiently supplied with the resin, with the result that a short shot tends to occur.

For preventing the above high gate, the gate diameter is, it can be considered, reduced down to, e.g. 0.5 mm. If reduced so, however, the short shot might easily occur.

The Japanese Patent Laid-Open Publication No. 5-293857 discloses a nozzle for the hot-runner of a thermoplastic resin mold constructed by, as shown in FIG. 2 therein, connecting a nozzle tip resin passage 2a of a hot-runner 2 of the thermoplastic resin mold to a straight pipe resin passage 5a of a spool 5 on a downstream side of the passage 2a by use of an eccentric gate 4, thereby preventing string stretch (resin residual) from occurring in the product.

The above publication shows no counter measure to the high gate and the short shot as shown in FIG. 8B.

SUMMARY OF THE INVENTION

It is a primary object of the present invention to provide a molding mold capable of preventing high gate and short shot.

It is another object of the present invention to provide a molding method using the molding mold capable of preventing the high gate and the short shot, an injection molding apparatus including the molding mold, and a molded product produced from the molding mold.

The present invention was contrived to obviate the problems pertaining to the high gate and the short shot which are caused when molding a product by use of the molding mold, wherein the present inventor as a result of having absorbed in the researches discovered such an approach to those problems that a plurality of passages are provided in a gate portion through which molten resin flows into a cavity of a molding mold.

According to the first aspect of the invention, a molding mold according to the present invention is provides with a plurality of molds for forming a cavity having a configuration corresponding to a shape of a molded product, and a gate portion, contiguous to the cavity, throughwhichamolten resin flows into the cavity, wherein the gate portion includes a plurality of passages. The number of the passages is, e.g., two.

The molding mold is provided with a plurality of the gate portions. The molding mold is further provided with a gate chip member. The gate chip member includes the gate portion.

Further, the gate portion is so disposed as to protrude into the cavity. With the construction, the surface of the molded product is formed with an impression owing to the gate portion. A plurality of gate residuals corresponding to the plurality of passages are formed within the impression and do not protrude from the impression. The molding mold is further provided with a runner portion, and the runner portion is heated. A hot-runner system can be thereby constructed.

The molding mold further includes a shunting portion, provided between the plurality of passages or between the two passages, for making a flow of the molten resin diverge toward the passages. The shunting portion includes a conical protruded portion or a protruded portion which lies in a diametrical direction of the gate portion.

According to the second aspect of the invention, a molding method of the present invention executes a molding process by use of the molding mold described above.

According to the third aspect of the invention, an injection molding apparatus of the present invention is provided with the molding mold described above, and a resin supply heating unit for pressurizing and supplying the molten resin to the molding mold. The resin supply heating unit includes a heating portion for heating and melting a resin material, a resin material supplying portion for supplying the heating portion with the resin material, and a pressurizing portion for pressurizing the molten resin within the heating portion and supplying the molding mold with the molten resin.

According to the fourth aspect of the invention, a molded product of the present invention is molded by the molding mold described above. In the molded product, a molding surface thereof has an impression formed by the gate portion. A plurality of gate residuals corresponding to the plurality of passages are formed within the impression, and the plurality of gate residuals do not protrude from the impression. For instance, the molded product is a half shell of a floppy disk, and two gate residuals are formed within the impression.

The molded product is provided with a recessed portion formed on the molded surface upon molding, and a plurality of protruded portions formed within the recessed portion.

The height of the protruded portions is less than the depth of the recessed portion.

BRIEF DESCRIPTION OF DRAWINGS

FIG. 2 is a diagram schematically showing a molding mold for molding the half shell of the floppy disk shown in FIG. 1A, and an injection molding apparatus as well;

DETAILED DESCRIPTION OF THE PREFERRED EMBODIMENTS

Figure 1A:
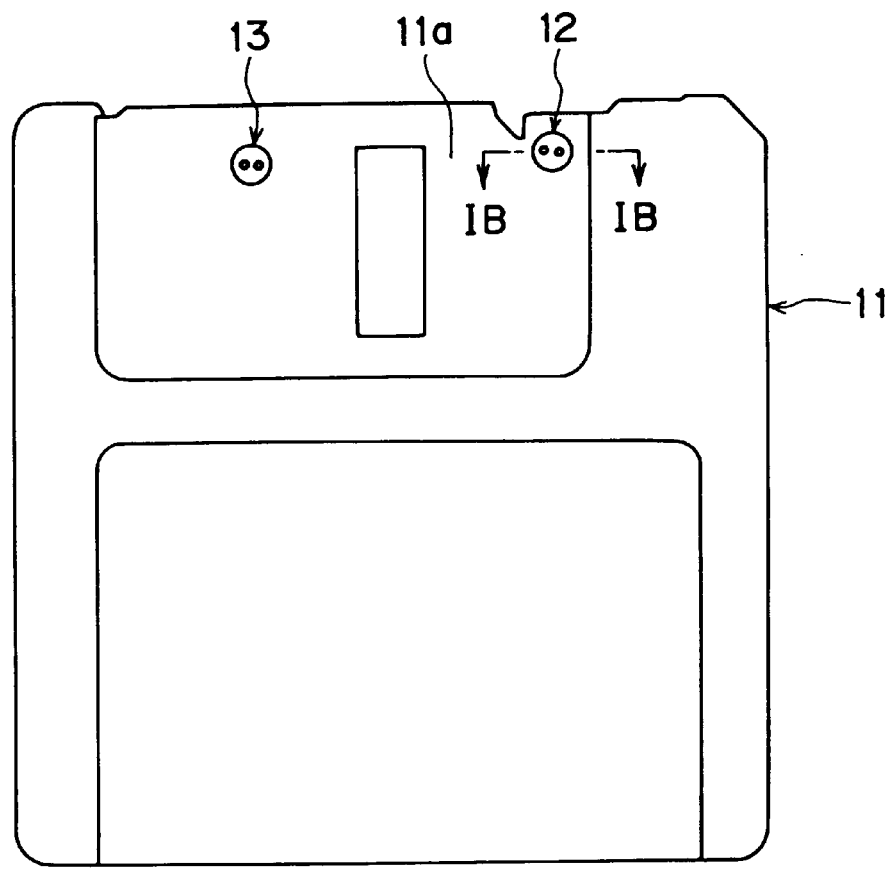
FIG. 1A is a plan view showing a half shell of a floppy disk molded by a molding mold in an embodiment of the present invention.

Embodiments of the present invention will hereinafter be described with reference to the accompanying drawings. As illustrated in FIG. 1A, a half shell 11 of a 3.5 inches micro floppy disk molded by a molding mold in accordance with the embodiment, includes recessed portions 12, 13 formed when molded in a shutter fitting portion 11a recessed for fitting a shutter. A shell of the floppy disk is constructed of the half shell 11 and another half shell identical therewith.

Given next is an explanation of a molding mold and an injection molding apparatus in an open type hot-runner system for molding the half shell 11 shown in FIG. 1A. As shown in FIG. 2, the molding mold includes a movable-side mold 31 and a stationary-side mold 32. A cavity 37 taking a configuration corresponding to a shape of the half shell 11 in FIG. 1A, is formed between those molds 31 and 32. A first gate tip 21 and a second gate tip 22 each having a cylindrical shape are fitted into the stationary-side mold 32.

Figure 3:
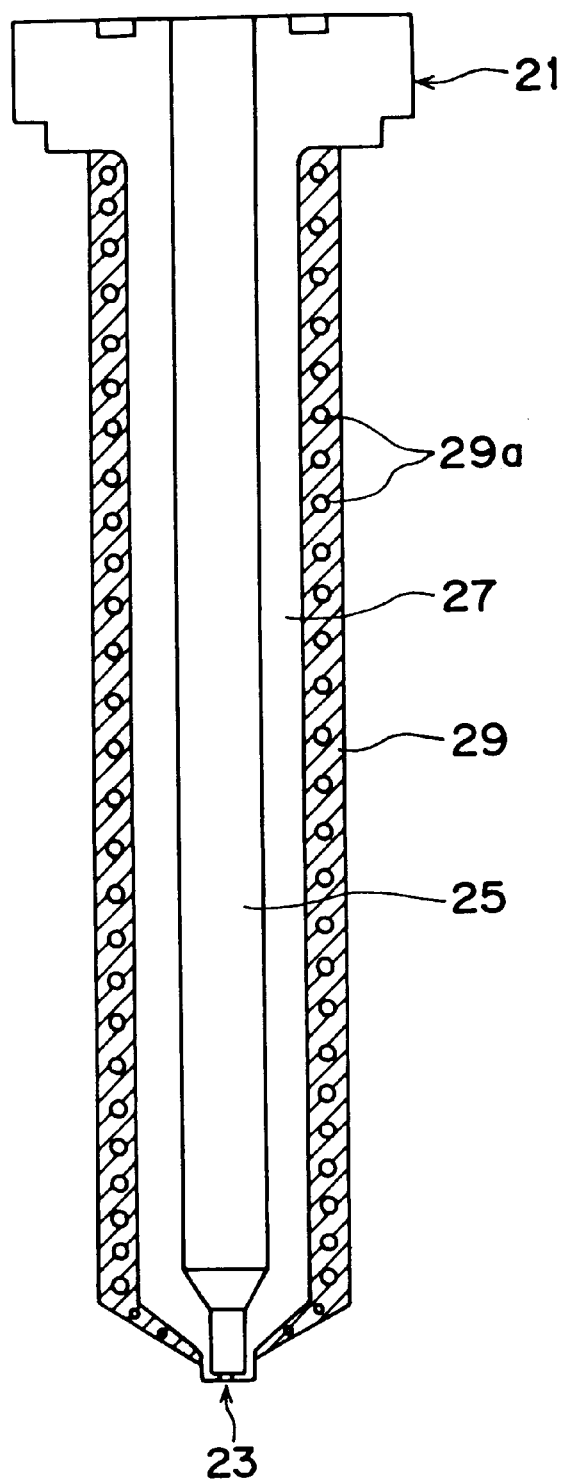
FIG. 3 is a vertical sectional view showing a gate tip of the molding mold shown in FIG. 2

As illustrated in FIGS. 2 and 3, the first gate tip 21 has a cylindrical member 27, a runner portion 25, formed in a hollowed portion of the cylindrical member 27, through which molten resin flows in an r-direction, and a gate portion 23 disposed at the tip of the cylindrical member so as to slightly protrude into the cavity 37, the tip of the gate portion 23 is formed with a hole from which the molten resin flows into the cavity 37. The second gate tip 22 similarly includes a cylindrical member 28, a runner portion 26 and a gate portion 24. The runner portions 25, 26 are so constructed that diameters thereof are formed small in the vicinities of the gate portions 23, 24.

As shown in FIG. 3, a heating element 29 wound inside with an exothermic coil 29a is disposed along a periphery of the cylindrical member 27 of the first gate tip 21. A heating element 30, which is the same as the heating element 29, is also disposed along a periphery of the cylindrical member 28 of the second gate tip 22. The resin passing through the runner portions 25, 26 is kept in the molten state by the heat emitted from those exothermic elements 29, 30, whereby the resin can flow into the cavity 37 from the gate portions 23, 24, respectively.

As shown in FIG. 2, a manifold 33 is disposed upwardly of the stationary-side mold 32. The molten resins flows into the runner portions 25, 26 from outlets 33b, 33c each communicating with a resin runner portion 33a formed inwardly of the manifold 33. A heating element may be provided in the manifold 33.

The injection molding apparatus includes, as illustrated in FIG. 2, a heating portion 34 for heating and melting a resin material of the half shell 11, a resin material supplying portion 35 for supplying the heating portion 34 with the resin material, and a pressurizing portion 36 for pressurizing the molten resin within the heating portion 34 and supplying the pressurized resin to the resin runner portion 33a of the manifold 33. The manifold 33 of the stationary-side mold 32 is fitted on the resin outlet side of the heating portion 34.

Figure 4A:
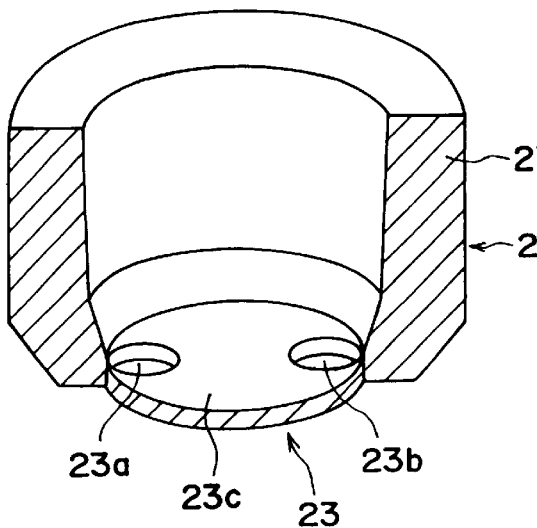
FIG. 4A is a sectional view showing a front end of the gate tip with some portions cut away in FIG. 3.
Figure 4B:
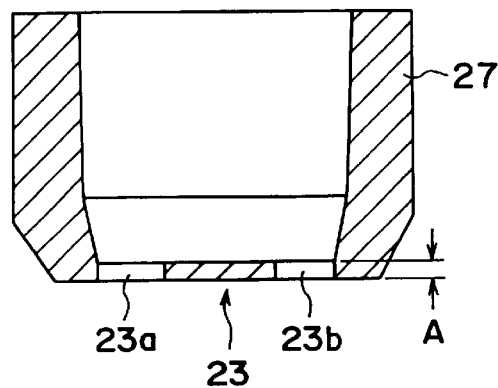
FIG. 4B is a vertical sectional view showing the gate tip in FIG. 4A.

Next, the gate portion 23 of the gate tip 21 shown in FIG. 3 is explained. As shown in FIGS. 4A and 4B, the gate portion 23 disposed at the tip of the cylindrical member 27 has a circular portion 23c having a predetermined thickness which is formed with two small-diameter holes 23a, 23b as a passage communicating with the cavity 37, these holes 23a, 23b being substantially symmetrical with respect to a diametrical direction of the circular portion 23c. A diameter of each of the holes 23a, 23b is, e.g., 0.5 mm. The molten resin from the runner portion 25 of the gate tip 21 flows via the holes 23a, 23b of the gate portion 23 into the cavity 37. The gate portion 24 of the gate tip 22 also has the same two small-diameter holes.

As described above, the molding mold in the embodiment is made as an open type in which the gate portion is open at all times, and is constructed of a hot-runner system in which the runner portion is heated.

A molding process by the molding mold and the injection molding apparatus described above will be explained with reference to FIGS. 2, 4A and 4B. A resin material involving use of polystyrene (PS) is supplied from the resin supplying portion 35, heated and molten by the heating portion 34, and pressurized by the pressurizing portion 36. The molten resin is fed by the pressure into the resin runner portion 33a of the manifold 33, and flows respectively to the runner portions 25, 26 of the gate tips 21, 22 via the outlets 33b, 33c. The runner portions 25, 26 are set at a high temperature by electrifying the heating elements 29, 30, and therefore the resins in the runner portions 25, 26 flow in an r-direction in an as-molten state. Then, the molten resin flows respectively into the cavity 37 via the holes 23a, 23b of the gate portions 23, 24, thus filling the cavity 37 with the resin. Thereafter, the movable-side mold 31 is, after the resin in the cavity 37 has been hardened, moved in such a direction as to separate from the stationary-side mold 32, whereby the molding mold is opened and the mold releasing process is thus carried out. Next, the half shell 11 of the floppy disk illustrated in FIG. 1A as a molded product is taken out.

Figure 1B:
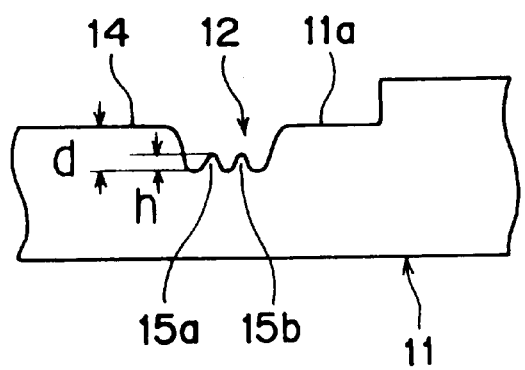
FIG. 1B is a sectional view taken substantially along the line IB—IB in FIG. 1A.

The half shell 11 thus molded is formed with impressions corresponding to the gate portions 23, 24. These impressions constitute the recessed portions 12, 13, as shown in FIG. 1A. As shown in FIG. 1B, two gate residuals 15a, 15b are formed inwardly of the recessed portion 12, corresponding to the two holes 23a, 23b in the gate portion 23 of the gate tip 21. The gate diameter (which is 0.5 mm) of each of the gate portions 23, 24 is, however, smaller than in the prior art (the gate diameter is 0.7 mm), and hence, even if the resin is stretched when the molds are separated, the gate residuals diminish to a more degree than in the prior art. As a result, a height h of each of the gate residuals 15a, 15b is less than a depth d of the recessed portion 12, and the gate residuals 15a, 15b do not protrude from a surface 14 of the shutter fitting portion 11a, whereby a high gate is not caused. Therefore, when fitting the shutter plate to the shutter plate fitting portion 11a, the gate residuals 15a, 15b do not become hindrances, and hence the removing step is unnecessary in the production process. Accordingly, since the post-process required in the prior art is herein unnecessary, the productivity is enhanced.

Further, owing to the two holes formed in the gate portion, the diametrical size of the gate through which the molten resin flows increases up to 1.0 mm, whereby the molten resin flows well in the gate portion, a moldability is enhanced, and an occurrence of short shot can be remarkably reduced. Further, even if the resin is hindered from flowing due to resin residual in one hole, the resin can flow into the cavity via another hole, thereby restraining the occurrence of short shot. Moreover, the gate portion 23 is constructed simply by forming the holes in the circular portion 23c, and the working is facilitated, whereby the cost for the parts can be reduced.

As discussed above, the gate portion is provided with the two molten resin passages, thereby making it feasible to restrain the high gate and the short shot.

Figure 5A:
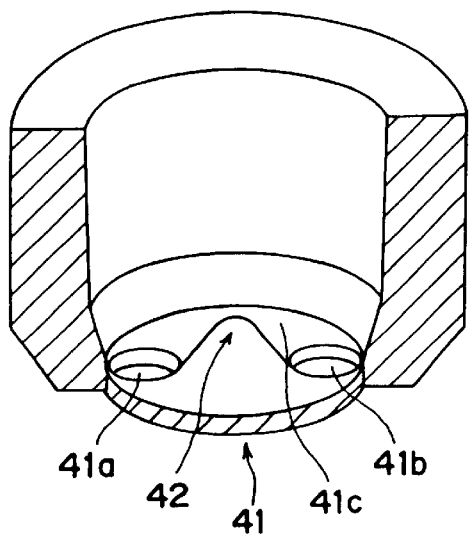
FIG. 5A is a sectional view showing the front end of another gate tip with some portions cut away.
Figure 5B:
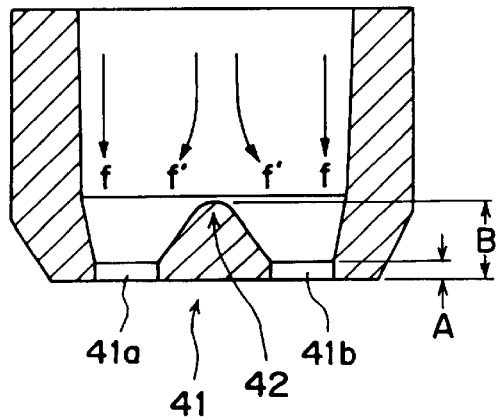
FIG. 5B is a vertical sectional view showing the gate tip in FIG. 5A.

Next, first through third modified examples of the gate portion of the gate tip will be explained. FIGS. 5A and 5B show a gate portion 41 in the first modified example. A conical protruded portion 42 as shunting means is provided substantially at the center of the circuit portion 41c of the gate portion 41. Holes 41a, 41b serving as molten resin passages are provided on both sides with the conical protruded portion 42 centered. The molten resin, as shown in FIG. 5B, flows toward the holes 41a, 41b substantially rectilinearly in an f-direction in the vicinity of an internal periphery. Further, in the vicinity of the conical protruded portion 42, the flow of resin diverges at the conical protruded portion 42 into f-directions toward the holes 41a, 41b respectively. The resin passage forks at the conical protruded portion 42 in the vicinities of the holes 41a, 41b of the gate portion 23, and the molten resin is able to flow well through both of the holes 41a and 41b. Therefore, it never happens that a large quantity of molten resin flows one of the holes 41a, 41b, resulting in an enhanced moldability. As discussed above, according to the first modified example, it is feasible to restrain the high gate and the short shot, and to enhance the moldability through the shunting means. Further, the gate portion 41 is provided with the conical protruded portion 42 and thereby increases in terms of its strength, and a lifetime of the parts may extend.

Figure 6A:
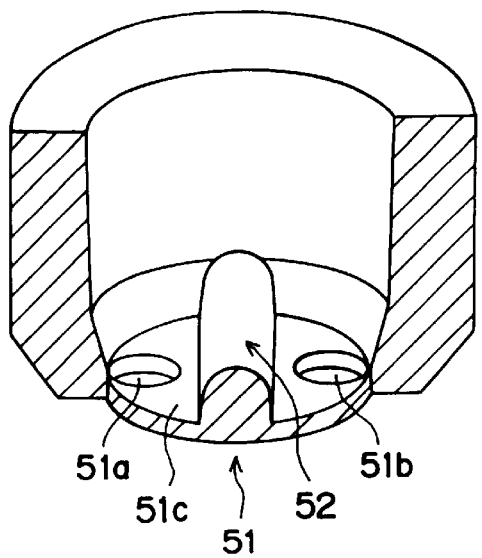
FIG. 6A is a sectional view showing the front end of other gate tip with some portions cut away.
Figure 6B:
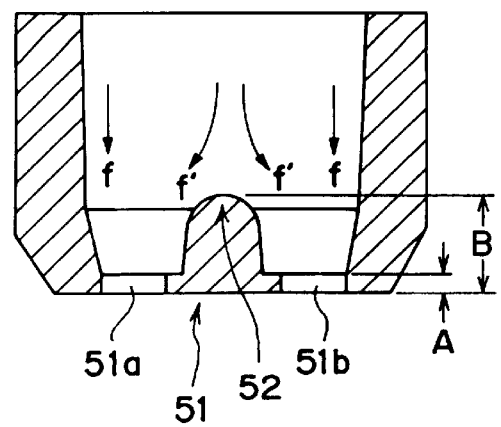
FIG. 6B is a vertical sectional view showing the gate tip in FIG. 6A.

FIGS. 6A and 6B show a gate portion 51 in a second modified example. The gate portion 51 is provided with a semicylindrical protruded portion 52 serving as shunting means with its tip rounded off, protruding from a circular portion 51c of the gate portion 51 and lying in the diametrical direction. Holes 51a, 51b serving as molten resin passages are provided on both sides with the semicylindrical protruded portion 52 centered. The molten resin, as shown in FIG. 6B, flows in the same way as shown in FIG. 5B, then diverges in the vicinity of the semicylindrical protruded portion 52, and flows toward the holes 51a, 51b respectively. As in the case described above, the molten resin diverges at the semicylindrical protruded portion 52 and can thereby flow well through both of the holes 51a and 51b. According to the second modified example, it is possible to restrain the high gate and the occurrence of short shot, and to enhance the moldability through the shunting means as in the case explained above. Further, the gate portion 51 is provided with the semicylindrical protruded portion 52 and thereby increases in terms of its strength, and a lifetime of the parts may extend. Moreover, a thickness (A) of the circular portion 51c can be set the same as a thickness (A) of each of the circular portions 23c, 41c shown in FIGS. 4B and 5B. A height (B) from the lower surface of the tip of the gate portion 51 up to the tip of the semicylindrical protruded portion 52, can be set the same as a height (B) from the lower surface of the tip of the gate portion 41 up to the tip of the conical protruded portion 42 shown in FIG. 5B.

Figure 7A:
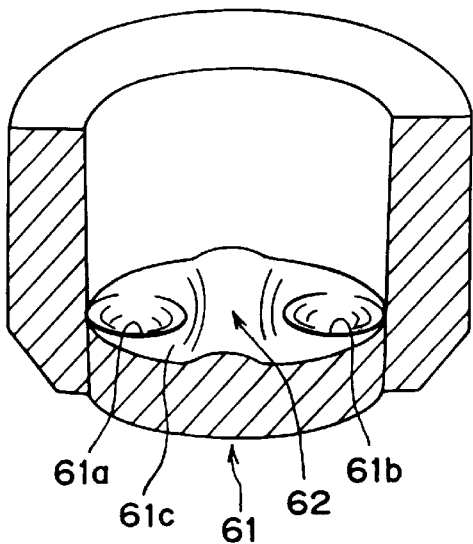
FIG. 7A is a sectional view showing the front end of other gate tip with some portions cut away.
Figure 7B:
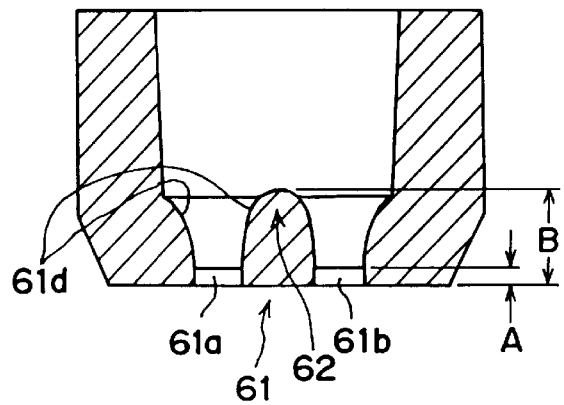
FIG. 7B is a vertical sectional view showing the gate tip in FIG. 7A.
Figure 8A:
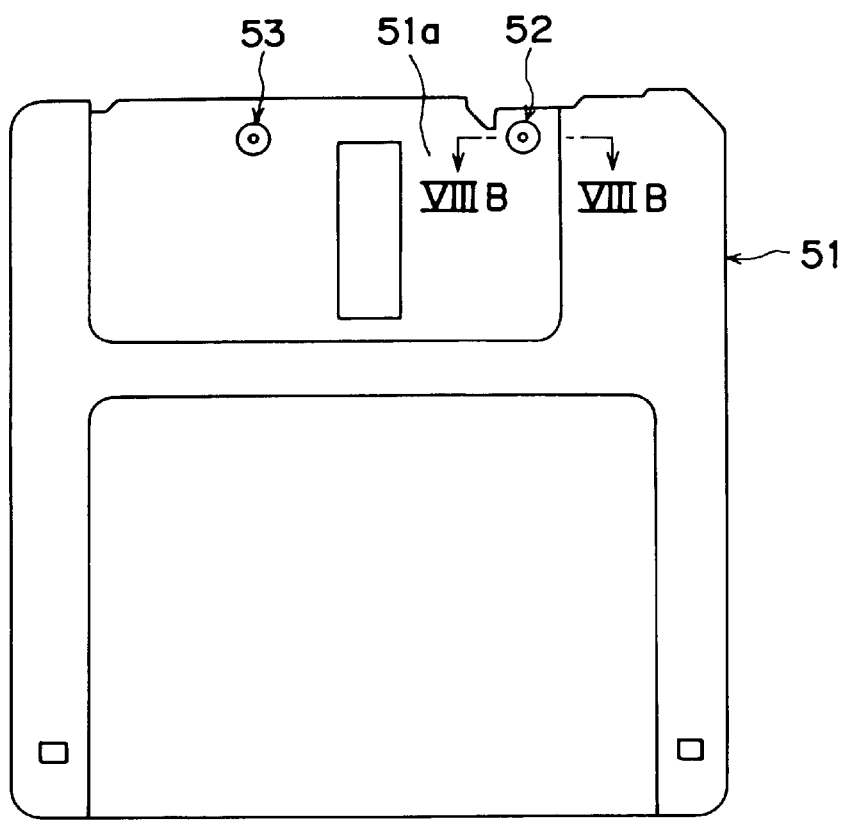
FIG. 8A is a plan view of the half shell of the floppy disk molded by a prior art molding mold.
Figure 8B:
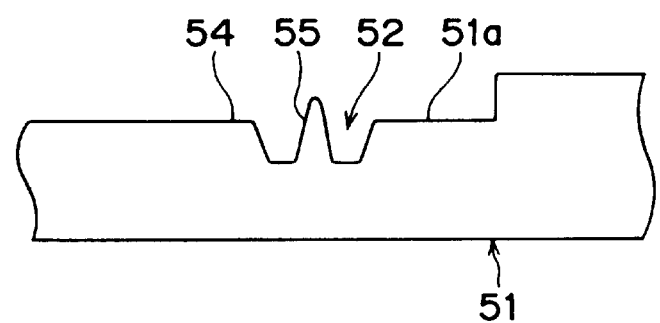
FIG. 8B is a sectional view taken substantially along the line VIIIB—VIIIB ion FIG. 8B.

FIGS. 7A and 7B show a gate portion 61 in a third modified example. The gate portion 61 includes holes 61a, 61b serving as molten resin passages. Formations of the holes 61a, 61b involve forming a conical hole portion sunk in a conical shape in two areas from an upper surface 61c of the gate portion 61. As shown in FIG. 7B, the conical hole portion has a conical peripheral surface 61d, and the hole 61a is formed rectilinearly in continuation toward the underside of the peripheral surface 61d. A protruded portion 62 is so formed as to swell on an upper surface 61c of a guide portion 61 and lies in the diametrical direction between two conical hole portions. The protruded portion 62 functions as shunting means as in the case discussed above. A length (A) of each of the holes 61a, 61b can be set the same as the thickness of each of the circular portions shown in FIGS. 4B, 5B and 6B. A height (B) from the lower surface of the tip of the gate portion 61 up to the tip of the protruded portion 62 can be set the same as the height (B) shown in FIGS. 5B and 6B. With the construction, the shunting effect can be obtained as done in the case given above, and the strength of the gate portion 51 can be enhanced, whereby the lifetime of the part may extend. According to the third modified example, it is possible to restrain the high gate and the short shot, and also to enhance the moldability through the shunting means in the same way as the above-mentioned. Also, in FIGS. 4B, 5B, 6B and 7B, each thickness (A) and each height (B) may be changed suitably, taking into consideration the strength, the shunting effect or the like.

Note that polystyrene is used as the resin material in the embodiment, however, resin material to be used is not limited to the resin material. The resin material may include, e.g., an ABS resin, anAS resin, polyoxymethylene (POM) or polycarbonate (PC), wherein the same effect as the above-mentioned can be obtained. Further, the molded product moldable by the present molding mold is not confined to the shell of the floppy disk but may be, as a matter of course, any kinds of products molded from the resin materials. In this case, the diameter of the passage may be appropriately changed according to the size, the thickness, or the like of the molded product.

Moreover, the present invention is not limited to the embodiments discussed above but may be modified within the scope of the technical concept of the present invention.

For example, two or more molten resin passages may be provided in one gate portion of the gate tip. Further, the number of the gate portions may be singular, two or more.

What is claimed is:

1. A molded product, comprising;
    a half shell of a floppy disk having a molded surface formed at a cavity surface by molding;
    a recessed portion formed upon the molded surface as a result of the molding thereof, the recessed portion having a depth; and
    a plurality of gate residuals within the recessed portion and protruding therefrom, the plurality of gate residuals being formed as a result of the molding of the molded surface;
    wherein each of the plurality of gate residuals has a height that is less than the depth of the recessed portion so that the plurality of gate residuals do not protrude beyond the recessed portion.

2. Molded product according to claim 1 having two gate residuals.

3. Molded product according to claim 1 having more than two gate residuals.

4. Molded product according to claim 1, further comprising a floppy disk shutter fitting into the recessed portion formed upon the surface.

* * * * *